United States Patent [19]
Ueno et al.

[11] Patent Number: 5,678,418
[45] Date of Patent: Oct. 21, 1997

[54] AIR-CONDITIONER

[75] Inventors: Yuichi Ueno, Kariya; Noriyoshi Miyajima, Nukata-gun; Osamu Ishida; Takashi Kageyama, both of Wako, all of Japan

[73] Assignees: Nippondenso Co., Ltd., Kariya; Honda Giken Kogyo Kabushiki Kaisha, Tokyo, both of Japan

[21] Appl. No.: 544,541

[22] Filed: Oct. 18, 1995

[30] Foreign Application Priority Data

Oct. 19, 1994 [JP] Japan .................. 6-253331

[51] Int. Cl.⁶ .......................................... F25B 5/02
[52] U.S. Cl. ................................. 62/200; 62/244
[58] Field of Search ................... 62/199, 200, 244

[56] References Cited

U.S. PATENT DOCUMENTS 4,473,109  9/1984  Kojima et al. .................. 62/244
4,637,220  1/1987  Sakano ........................... 62/244
4,873,837  10/1989  Murray ........................... 62/199

*Primary Examiner*—William E. Tapolcai
*Attorney, Agent, or Firm*—Cushman, Darby & Cushman IP Group of Pillsbury Madison & Sutro LLP

[57] ABSTRACT

An air-conditioner wherein the lubrication oil flowing through the refrigerant passage along with the refrigerant is reliably returned to the refrigerant compressor by having the refrigerant piping at the suction side of the compressor comprised of a first refrigerant piping and a second refrigerant piping connected in series with the same, the large diameter first refrigerant piping extending from a high position to a low position and the relatively small diameter second refrigerant piping extending in substantially the horizontal direction.

21 Claims, 4 Drawing Sheets

HIGH ↕ LOW

AIR-CONDITIONER

BACKGROUND OF THE INVENTION

1. Field of the Invention

The present invention relates to an air-conditioner, in particular to refrigerant piping for a vehicular air-conditioner.

2. Description of the Related Art

In the past, as shown in FIG. 7, there has been known a vehicular air-conditioner provided with two evaporators: one for the front (front seats) and one for the rear (rear seats).

The refrigeration cycle 100 of a vehicular air-conditioner has a rear evaporator 103 and a front evaporator disposed in parallel between the refrigerant downstream side of a receiver 101 and the suction side of the compressor 102. The front evaporator 104 cools the air discharged from outlets disposed at the front of the cabin. The rear evaporator cools the air discharged from outlets disposed above the rear seats in the cabin. That is, the rear evaporator is exclusively for the use of the passengers on the rear seats.

Since the rear evaporator 103 is exclusively for the passengers on the rear seats, it is smaller in size and smaller in cooling capacity compared with the front evaporator 104.

The refrigeration cycle 100 has a notably small amount of refrigerant flowing in the rear evaporator 103 when the required cooling capacity of the front evaporator 104 is maximum and the required cooling capacity of the rear evaporator 103 is minimum. Since the amount of the refrigerant is extremely small, there is the problem that the oil for protection of the compressor 102 sealed in the refrigeration cycle together with the refrigerant will accumulate in the suction piping 105 and will not return to the compressor 102 and therefore the durability of the compressor 102 will fall.

In the past, therefore, the practice has been to reduce the overall size of the cross-sectional area of the flow path of the suction piping 105 connecting the downstream side of the rear evaporator 103 and the suction side of the compressor 102 compared with the front and increase the rate of flow of the refrigerant so as to flush the oil along with the refrigerant and thereby ensure the oil returns to the compressor 102.

If the cross-sectional area of the flow path of the suction piping 105 is made smaller, the pressure loss at the suction piping 105 ends up becoming larger and the following problem occurs.

For example, when cooling in cases such as when parking a car on a hot day in the summer season and then starting the air-conditioner, air of a high temperature of 50° to 60° C. is fed into the rear evaporator 103 and the flow of air used is made maximum. Since the pressure loss at the suction piping 105 is larger as explained above, there is the problem that a sufficient cooling capacity cannot be exhibited.

To reduce the pressure loss at the suction piping 105, it has been considered to increase the cross-sectional area of the flow path of the suction piping 105, but as mentioned above, if the cross-sectional area of the flow path is made larger, the rate of flow of the refrigerant becomes slower, the oil for protection of the compressor 102 accumulates at the suction piping 105, and there is the problem of a decline in the durability of the compressor 102.

SUMMARY OF THE INVENTION

Therefore, the present invention was made in consideration of the above problems and has as its object the provision of an air-conditioner able to ensure return of the oil to the compressor without reducing the cooling capacity.

The present invention provides an air-conditioner provided with a refrigeration cycle comprised of a refrigerant compressor for performing the suction, compression, and discharge of the refrigerant, a refrigerant condenser for condensing the high pressure refrigerant, at least one refrigerant evaporator disposed between the refrigerant downstream side of the refrigerant condenser and suction side of the refrigerant compressor for causing the low pressure refrigerant to evaporate, and refrigerant piping connecting the same, wherein the following technical means are adopted:

the refrigerant piping connecting the refrigerant downstream side of the refrigerant evaporator and the suction side of the refrigerant compressor is provided with a first refrigerant piping through which the inside refrigerant flows from a high position to a low position and a second refrigerant piping connecting with the inside of the first refrigerant piping and the cross-sectional area of the flow path of at least part of first refrigerant piping is made larger than the cross-sectional area of the flow path of the second refrigerant piping.

According to this configuration of the present invention, since the cross-sectional area of the flow path of at least part of the first refrigerant piping is made larger than the cross-sectional area of the flow path of the second refrigerant piping, the first refrigerant piping has a smaller pressure loss and the lubrication oil for protection of the refrigerant compressor in the first refrigerant piping is made to flow down to the downstream side by gravity. Further, the flow rate of the refrigerant in the second refrigerant piping becomes faster than the flow rate of the refrigerant flowing in the first refrigerant piping and the lubrication oil is flushed downstream along with the refrigerant.

That is, the refrigerant piping connecting the downstream refrigerant side of the refrigerant evaporator and the suction side of the refrigerant compressor has a portion where the cross-sectional area of the flow path is large and a portion where it is small. At the large portion, the lubrication oil is sent to the downstream side by gravity, while at the portion where the cross-sectional area of the flow path is small, the flow rate of the refrigerant becomes faster and the lubrication oil is flushed along. Due to this, it becomes possible to reduce the pressure loss of the refrigerant piping as a whole and to ensure the return of the lubrication oil to the refrigerant compressor without causing a reduction of the cooling capacity of the refrigerant evaporator.

BRIEF DESCRIPTION OF THE DRAWINGS

These and other objects and features of the present invention will be explained in further detail below by preferred embodiments described with reference to the accompanying drawings, in which.

DESCRIPTION OF THE PREFERRED EMBODIMENTS

A first embodiment of an air-conditioner according to the present invention will be explained first with reference to the drawings.

Note that this embodiment relates to an air-conditioner for vehicular use.

Figure 2:
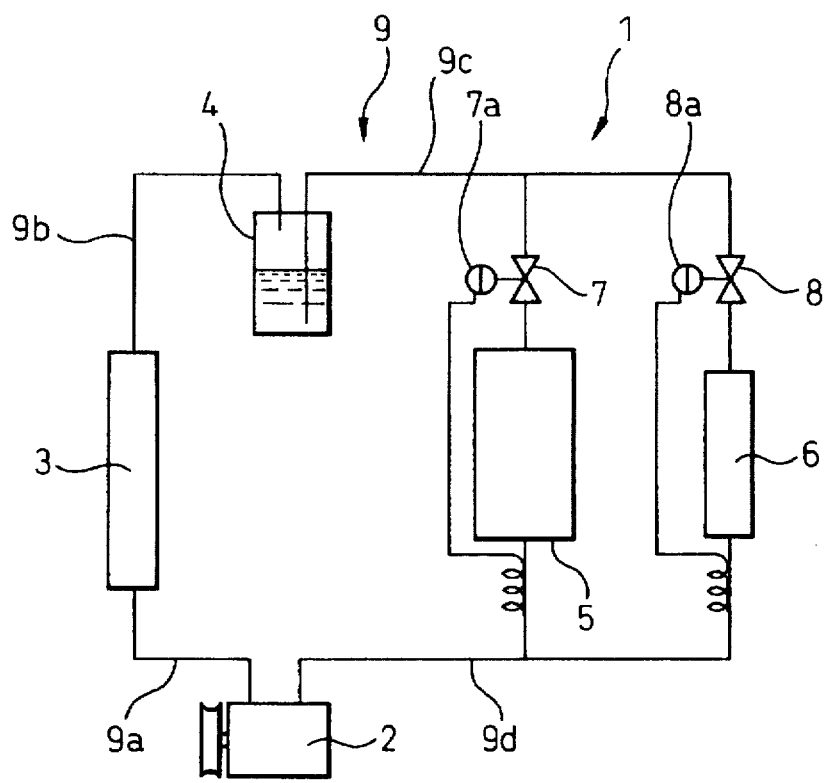
FIG. 2 is a view of the overall configuration of a refrigeration cycle in the first embodiment.

FIG. 2 is a view of the overall configuration of a refrigeration cycle 1 of a vehicular air-conditioner.

Figure 3:
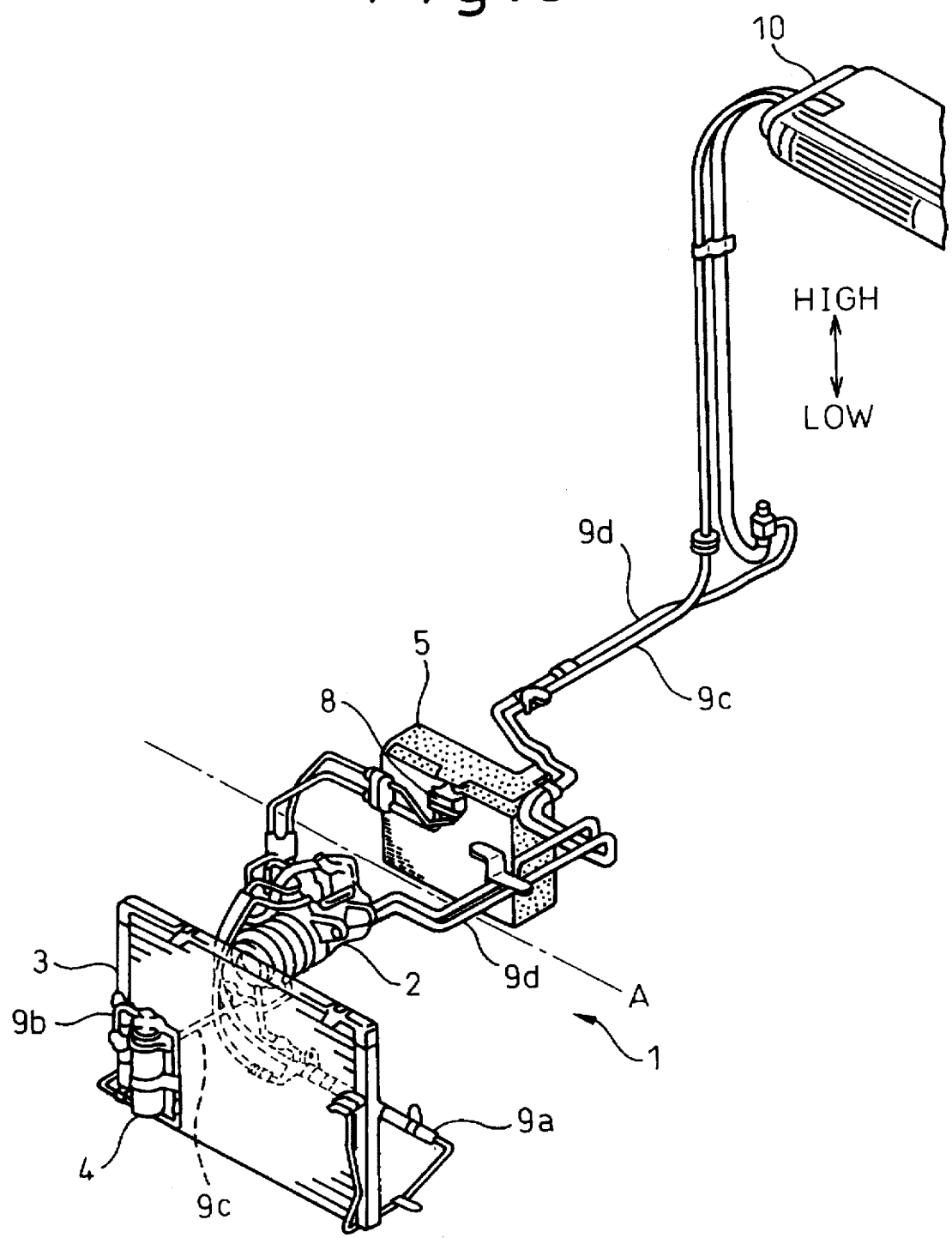
FIG. 3 is a view of the state of the refrigeration cycle in the first embodiment mounted on a vehicle.

FIG. 3 shows the state of the refrigeration cycle 1 mounted on a vehicle.

In FIG. 3, the area to the left of the dot-chain line A shows the engine compartment and the area to the right the passenger cabin.

The refrigeration cycle 1 is comprised of a compressor 2, condenser 3, receiver 4, front evaporator 5, rear evaporator 6, first and second pressure reducers 7 and 8, and refrigerant piping 9 connecting these components.

The compressor 2 constitutes the refrigerant compressor of the present invention. It is disposed in the engine compartment of the vehicle (bottom left in FIG. 3) and is driven by the vehicle engine to compress the refrigerant and create a high temperature, high pressure gaseous refrigerant. The compressor 2 is controlled to turn on and off in accordance with set conditions by a magnetic clutch (not shown).

The condenser 3 subjects the high temperature, high pressure gaseous refrigerant from the compressor 2 to the flow of air from a cooling fan (not shown) to perform heat exchange between the air and the gaseous refrigerant and condense and liquify the gaseous refrigerant. The condenser 3 is provided at a position in the engine compartment of the vehicle receiving the flow of air when the vehicle is moving.

The receiver 4 is a gas-liquid separating means for separating the gaseous state refrigerant and the liquid state refrigerant in the refrigerant condensed and liquified by the condenser 3. It temporarily stores the liquid state refrigerant.

The first and second pressure reducers 7 and 8 cause the liquid state refrigerant to expand and be reduced in pressure. For example, they are comprised of expansion valves etc. The first and second pressure reducers 7 and 8 are provided with refrigerant adjusting means 7a and 8a for determining the amount of refrigerant sent to the compressor 2 in accordance with the refrigerant temperature at the position directly downstream of the refrigerant at the front and rear evaporators 5 and 6 explained later.

The front and rear evaporators 5 and 6 constitute the first and second refrigerant evaporators of the present invention. By the pressure reduction and expansion by the first and second pressure reducers 7 and 8, heat exchange is caused between the refrigerant which has been lowered in temperature and the flow of air caused by the blower disposed in the duct (not shown) of the vehicular air-conditioner, whereby the flow of air is cooled and the refrigerant is evaporated to a gas.

The front evaporator 5 is provided along with other air-conditioner components below the front panel (not shown) disposed in the passenger cabin between the engine compartment and the passenger cabin. That is, the front evaporator 5 cools the air discharged from the outlet disposed at the front of the passenger cabin.

The refrigerant flowing through the front evaporator 5 is subjected to heat exchange with the air inside the passenger cabin (inside air mode) or the air outside the passenger cabin (outside air mode) selected by an inside/outside air switching means (not shown) provided in the vehicle air-conditioner.

The rear evaporator 6 is disposed in the cooling unit 10 as shown in FIG. 3. The cooling unit 10 is disposed at the ceiling portion of the rear seat side (rear side) of the vehicle. That is, the rear evaporator 6 cools the air discharged from the rear seat outlets provided at the ceiling portion of the rear seat side of the passenger cabin.

The cooling unit 10 is provided with an air passage leading air into the passenger cabin (rear of the passenger cabin). At the air upstream side position of the cooling unit 10, there is provided a blower (not shown) generating a flow of air in the cooling unit 10. At the air downstream side of the blower, there is disposed the above-mentioned rear evaporator 6 in a manner blocking the entire air passage. The blower is designed to be able to be changed in capacity by the passengers (mainly the passengers seated in the rear seats) by a control panel (not shown) provided in the passenger cabin.

In this embodiment, further, the air taken into the cooling unit 10 and subjected to heat exchange with the rear evaporator 6 is limited to the air inside the passenger cabin, i.e., is not selectable by the inside/outside air switching means such as with the front evaporator 5.

The rear evaporator 6, further, is exclusively for the passengers of the rear seats, so is smaller in size compared with the front evaporator 5 and has a smaller cooling capacity than the front evaporator 5.

The refrigerant piping 9 connects the above components. Divided further, it is comprised of a discharge side refrigerant piping 9a connecting the discharge side of the compressor 2 and the refrigerant upstream side of the condenser 3, a piping 9b connecting the refrigerant downstream side of the condenser 3 and the refrigerant upstream side of the receiver 4, a liquid side refrigerant piping 9c branched in two and connecting the refrigerant downstream side of the receiver 4 and the refrigerant upstream side of the first and second pressure reducers 7 and 8, and a suction side refrigerant piping 9d connecting the refrigerant downstream side of the front evaporator 5 and the rear evaporator 6 and the suction side of the compressor 2 and exhibit a Y-shape converging the gaseous refrigerant discharged from the refrigerant downstream side of the front evaporator 5 and the rear evaporator 6.

That is, the first pressure reducer 7 and front evaporator 5 and the second pressure reducer 8 and rear evaporator 6 are disposed in parallel between the refrigerant downstream side of the receiver 4 and the suction side of the compressor 2.

Further, a predetermined amount of lubricant oil is sealed together with the refrigerant in the refrigeration cycle 1. The lubrication oil lubricates the sliding portions of the compressor 2 and improves the durability of the compressor 2.

Next, a more detailed explanation will be made of the suction side refrigerant piping 9d—a key part of the present invention.

Figure 1:
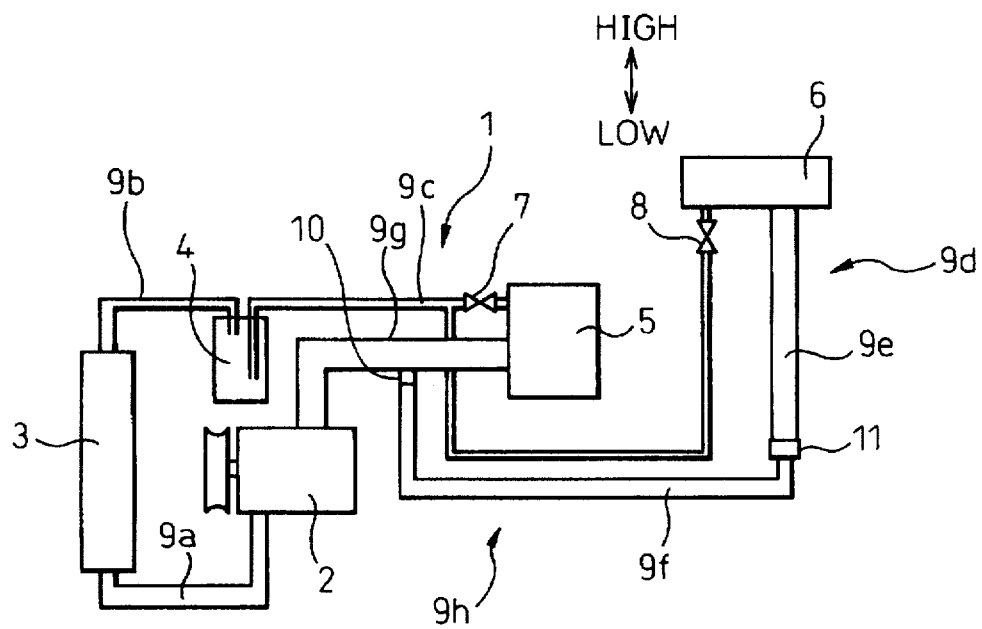
FIG. 1 is a schematic view of the configuration of the cooling piping in a first embodiment of the present invention.

FIG. 1 is a schematic view of the configuration of the suction side refrigerant piping 9d.

The suction side refrigerant piping 9d, as explained above, has gaseous refrigerant flowing inside it. It is formed in a cylindrical pipe form by aluminum etc. Note that the material of the suction side refrigerant piping 9d and the cross-sectional shape of the flow path of the same may be any material or shape.

The suction side refrigerant piping 9d connects the refrigerant downstream side of the rear evaporator 6 and the suction side of the compressor 2, so is extremely long in length. Here, the suction side refrigerant piping 9d becomes complicated in shape due to the considerations over mounting in a vehicle, ease of installation, and interference with other components as shown in FIG. 3. It is comprised by a plurality of separate refrigerant pipings connected together.

Therefore, for purposes of explanation, as shown in FIG. 1, the configuration is simplified and is assumed to consist of the first refrigerant piping 9e, second refrigerant piping 9f, and third refrigerant piping 9g.

The third refrigerant piping 9g connects the refrigerant downstream side of the first evaporator 5 and the suction side of the compressor 2. A joint 10 is provided as a means for connecting to and affixing one end of the second refrigerant piping 9.

The first refrigerant piping 9e is housed for example in the side wall of the vehicle and extends substantially perpendicularly from the top direction (high position) to the bottom direction (low position). Further, in this embodiment, the first refrigerant piping is a total length of 1.5 m. At one end at the refrigerant downstream side, a joint 11 is formed as a means for connecting to and affixing the second refrigerant piping 9f.

The second refrigerant piping 9f connects the refrigerant downstream side of the first refrigerant piping 9e and the third refrigerant piping 9g. The second refrigerant piping 9f leads from the engine compartment of the vehicle to the rear of the vehicle and passes under the floor of the passenger cabin with the majority of it substantially extending in the horizontal direction. The second refrigerant piping 9f are connected and affixed at its two ends to the above-mentioned joint 10 and joint 11. Note that the joint 10 and the joint 11 may be configured in any manner. Further, in this embodiment, the total length of the second refrigerant piping 9f is 1.8 m.

Here, the cross-sectional area of the first refrigerant piping 9e is uniform along the direction of flow and is set to be larger compared with the cross-sectional area of the second refrigerant piping 9f. The inside diameter of the first refrigerant piping 9e is made 0.75 inch and the inside diameter of the second refrigerant piping 9f is made 0.5 inch.

That is, pressure loss per unit length of the first refrigerant piping 9e becomes smaller compared with the pressure loss per unit length of the second refrigerant piping 9f. If the total 3.3 m length of refrigerant piping obtained by connecting the first refrigerant piping 9e and the second refrigerant piping 9f is made the rear side refrigerant piping 9h, then the pressure loss of the rear side refrigerant piping 9h even seen overall becomes smaller compared with the case where the cross-sectional area of the flow path of the first refrigerant piping 9 is equal to the cross-sectional area of the flow path of the second refrigerant piping 9f (0.5 inch).

Table 1 shows the temperatures of the air cooled by the front and the rear evaporators 5 and 6 in cases where the present inventors changed the cross-sectional areas of the flow paths of the first refrigerant piping 9e and the second refrigerant piping 9f.

Note that the tests were conducted under conditions of an outside air temperature of 35° C., a sunlight of 1000 W, a running speed of 40 km/h, an inside air mode at the front side, cooling a maximum flow of air from the blowers, and measuring the discharge temperatures in the steady state where the temperature inside the passenger cabin approached the set temperature, that is, after 40 minutes after the start of operation of the vehicular air-conditioner. Further, the discharge temperature was measured near the outlets provided at the front part and rear part of the inside of the passenger cabin. Further, [1] indicates the inside diameter of the second refrigerant piping 9f and [2] the inside diameter of the first refrigerant piping 9e.

TABLE 1

| | Inside diameter of piping (inches) | Front outlet temperature (°C.) | Rear outlet temperature (°C.) |
|---|---|---|---|
| 1 | [1] 0.5<br>[2] 0.5 | 6.2 | 12.4 |
| 2 | [1] 0.5<br>[2] 0.75 | 6.0 | 11.3 |
| 3 | [1] 0.75<br>[2] 0.75 | 5.6 | 11.1 |

Considering the findings of the above tests, it is learned that by making the cross-sectional area of the flow path of the first refrigerant piping 9e larger than the cross-sectional area of the flow path of the second refrigerant piping 9f, the discharge temperature at the rear side, that is, the cooling capacity of the rear evaporator, becomes improved compared with the case where the cross-sectional areas of the flow paths of the first and second refrigerant pipings 9e and 9f are both 0.5 inch.

That is, compared with the test conditions 1, the test conditions 2 resulted in a smaller pressure loss of the rear refrigerant piping 9h as a whole and an increase in the amount of refrigerant per unit time flowing in the second evaporator 6, so an improvement of the cooling capacity.

Further, a look at the discharge temperature of the front shows that the front discharge temperature falls from test conditions 1 to 3. This is believed because the air discharged at the rear lowers the temperature of the passenger cabin as a whole.

Further, a look at the discharge temperature at the rear shows that with the test conditions 3, that is, if the cross-sectional areas of the flow paths of both the first refrigerant piping 9e and the second refrigerant piping 9f are equally increased, the discharge temperature at the rear becomes the lowest, but there is concern over a poorer return of the lubrication oil sealed in the refrigerant piping 9 along with the refrigerant.

Table 2 shows the results of tests on the return of lubrication oil when changing the cross-sectional areas of the flow paths of the first refrigerant piping 9e and the second refrigerant piping 9f explained above.

Note that the tests were carried out under conditions of an outside air temperature of 35° C., sunlight of 1000 W, the vehicle engine in the idling state, the introduction of outside air and the maximum flow of air at the front, and the introduction of inside air and the minimum flow of air at the rear (not zero), that is, under the worst conditions for the return of lubrication oil at the rear.

TABLE 2

| | Inside diameter of piping (inches) | Oil circulation rate (%) |
|---|---|---|
| 1 | [1] 0.5<br>[2] 0.5 | 1.5 |
| 2 | [1] 0.5<br>[2] 0.75 | 1.0 |
| 3 | [1] 0.75<br>[2] 0.75 | 0 |

A look at the findings of these tests shows that as explained above, under the test conditions 3, the rate of return of lubrication oil became zero. If the compressor 2 were continued to be operated in that state, a problem would arise in the durability of the compressor 2. However, a look at the test conditions 2 shows that the rate of return of the lubrication oil became 1.0 percent—which poses no problem in terms of the durability of the compressor 2.

Here, it was believed that since the cross-sectional area of the flow path of the first refrigerant piping 9e was made larger than the cross-sectional area of the flow path of the second refrigerant piping 9f, the rate of flow of the refrigerant in the first refrigerant piping 9e would become smaller than that of the second refrigerant piping 9h and there would be difficulty in the lubrication oil returning to the compressor 2. The fact that the return of the lubrication oil was able to be secured was due to the following reasons:

That is, the first refrigerant piping 9e in this embodiment extends from a high position to a low position, so the lubrication oil depositing on the surface inside the piping flows down due to gravity and is sent into the second refrigerant piping 9f.

The lubrication oil sent into the second refrigerant piping 9f is faster in rate of flow than the refrigerant in the first refrigerant piping 9e, so is flushed along together with the refrigerant and sent to the suction side of the compressor 2.

By making the cross-sectional area of the flow path of the first refrigerant piping 9e in which the refrigerant flows from a high position to a low position larger than the cross-sectional area of the flow path of the second refrigerant piping 9f, the pressure loss of the rear refrigerant piping 9h is reduced and the cooling capacity improved. By sending the lubrication oil to the refrigerant downstream side naturally by gravity, it is possible to ensure the return of the lubrication oil to the compressor 2.

The above explanation was made with reference to the first embodiment of the present invention, but the present invention can also be applied to the following embodiments.

Figure 4:
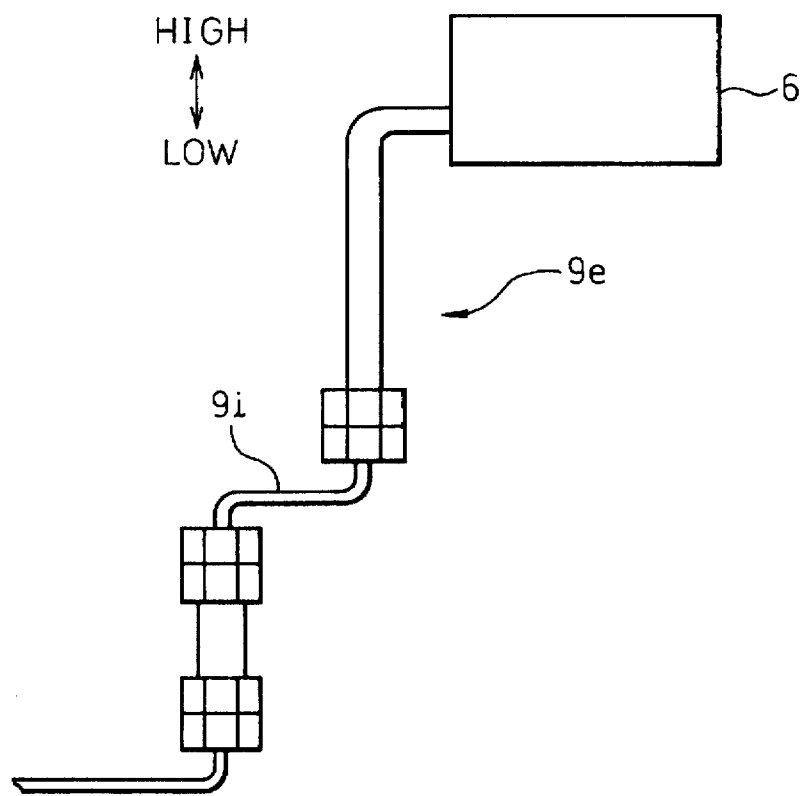
FIG. 4 is a view of another embodiment.
Figure 5:
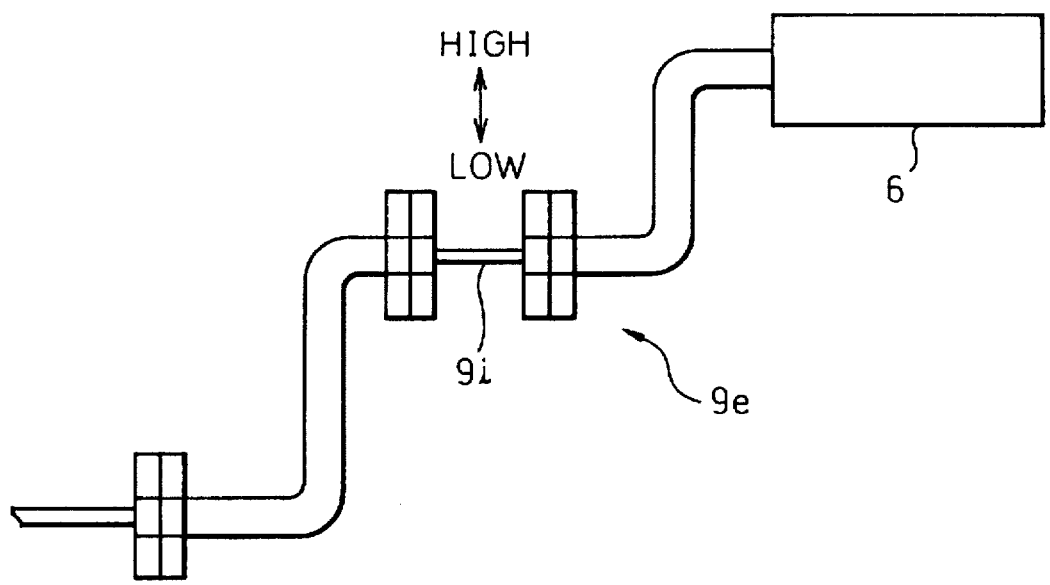
FIG. 5 is a view of still another embodiment.

In the first embodiment, the first refrigerant piping 9e extended substantially in a straight line from a high position to a low position, but as shown in FIG. 4 and FIG. 5, it is also possible to divide the first refrigerant piping 9e into a number of sections and form them into steps having a horizontal portion. In this case, the cross-sectional area of the flow path of the refrigerant piping 9i forming the horizontal portion may be made smaller than the cross-sectional area of the flow path of the other refrigerant piping sections constituting the first refrigerant piping 9e. Note that in this case, the refrigerant piping 9i constitutes the second refrigerant piping of the present invention.

Figure 6:
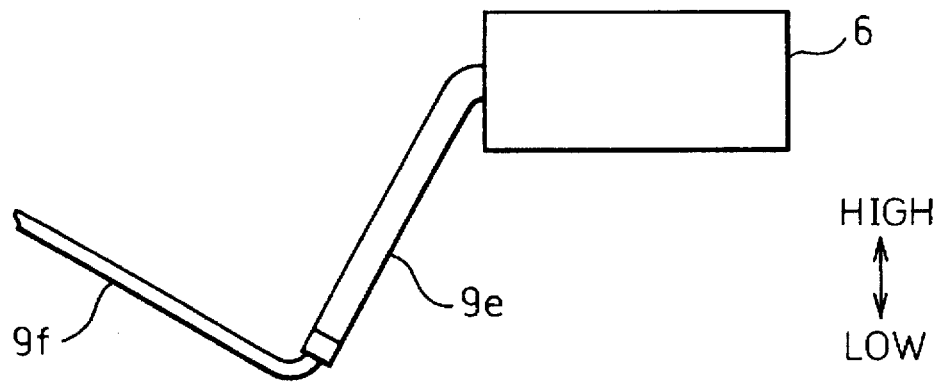
FIG. 6 is view of still another embodiment.
Figure 7:
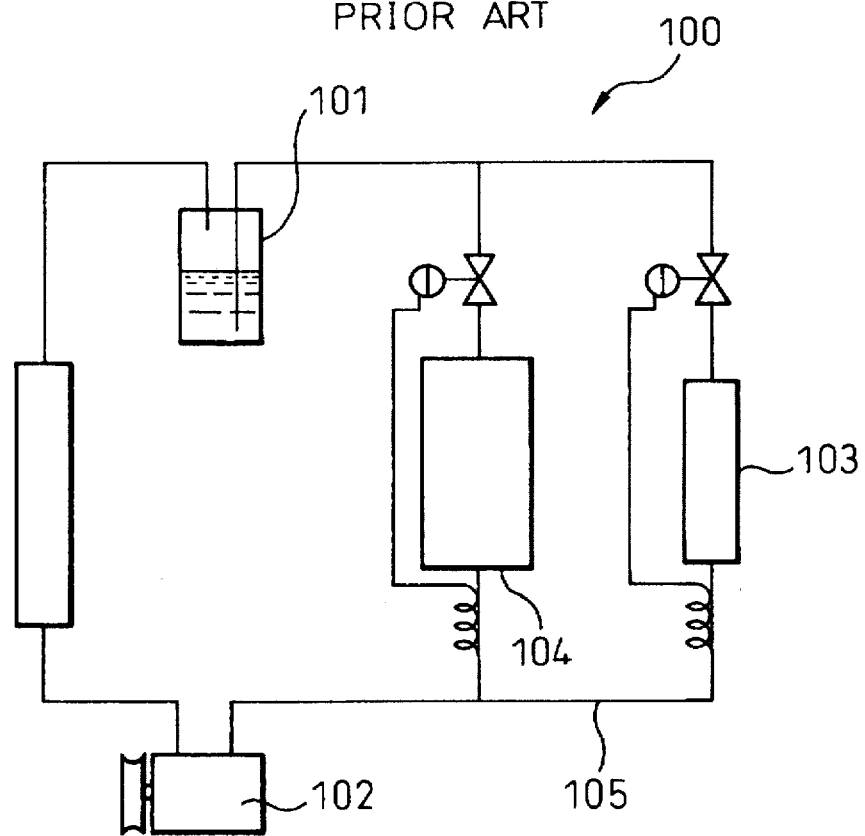
FIG. 7 is a schematic view of a conventional refrigeration cycle.

Further, in the first embodiment, the first refrigerant piping 9e extended in a substantially perpendicular direction from a high position to a low position, but as shown in FIG. 6, it may extend in any direction so long as the refrigerant in the piping flows from a high position to a low position.

Further, in the first embodiment, the second refrigerant piping 9f extended in a substantially horizontal direction, but as shown in FIG. 6, it may extend in any direction.

Further, in the first embodiment, the first refrigerant piping 9e was made larger overall in inside diameter than the inside diameter of the second refrigerant piping 9f, but it is also possible to make the inside diameter of a part of it larger.

Further, in the above embodiment, a rear evaporator 6 with a small cooling capacity was provided for the rear seats of the vehicle, but when the heat load of the rear of the passenger cabin is large, such as with a camping car, it is also possible to applying the refrigerant piping of the present invention to the front evaporator.

Further, in the above embodiment, the invention was applied to a dual type system with evaporators mounted at both the front and rear of the vehicle, but the present invention may also be applied to a single type with the evaporator mounted at just the front of the vehicle. For example, in a rear engine type vehicle with the engine provided at the back of the vehicle, the above suction side refrigerant piping 9e becomes longer in length and may extend in the vertical direction. Further, in such a vehicle, there are some two-passenger specifications. When the heat load of the vehicle is extremely small, the required cooling capacity becomes remarkably small and return of the lubrication oil to the compressor becomes difficult, but if the refrigeration piping of the present invention is applied, it is possible to secure return of the lubrication oil to the compressor without reducing the cooling capacity.

Also, in this embodiment, a single refrigerant passage was constituted by connecting the suction side refrigerant piping 9d connecting the downstream side of the rear evaporator 6 and the suction side of the compressor 2 with the first refrigerant piping 9e and the second refrigerant piping 9f, but it is also possible to dispose a plurality of first refrigerant pipings 9e in parallel to increase the cross-sectional area of the flow path of the refrigerant passage in which the refrigerant flows from a high position to a low position compared with that of the second refrigerant piping 9f. In this case, the cross-sectional area of the flow path of one first refrigerant piping 9e may be smaller than that of the second refrigerant piping 9f.

Further, in the above embodiment, the refrigerant piping of the present invention was applied to a vehicular airconditioner, but it is of course possible to apply it to a home air-conditioner or an industrial air-conditioner.

We claim:

1. An air-conditioner provided with a refrigeration cycle comprised of a refrigerant compressor for performing the suction, compression, and discharge of the refrigerant, a refrigerant condenser for condensing the high pressure refrigerant, at least one refrigerant evaporator disposed between the refrigerant downstream side of the refrigerant condenser and suction side of the refrigerant compressor for causing the low pressure refrigerant to evaporate, and refrigerant piping connecting the same, wherein the refrigerant piping connecting the refrigerant downstream side of the refrigerant evaporator and the suction side of the refrigerant compressor is provided with a first refrigerant piping through which the inside refrigerant flows from a high position to a low position and a second refrigerant piping connecting with the first refrigerant piping and through which the inside refrigerant flows in a substantially horizontal direction or flows from a low position to a high position, and the cross-sectional area of the flow path of the second refrigerant piping is made smaller than the cross-sectional area of the flow path of the first refrigerant piping.

2. An air-conditioner as set forth in claim 1, wherein a plurality of refrigerant evaporators for causing the low pressure refrigerant to evaporate are provided between the refrigerant downstream side of the refrigerant condenser and the suction side of the refrigerant compressor, the plurality of refrigerant evaporators are comprised of at least a first and second refrigerant evaporator, and the refrigerant piping by connecting the refrigerant downstream side of the plurality of refrigerant evaporators and the suction side of the refrigerant compressor connects the refrigerant downstream side at least one of the first and second refrigerant evaporators and the suction side of the refrigerant compressor.

3. An air-conditioner as set forth in claim 2, wherein the cooling capacity of the first refrigerant evaporator is larger than that of the second refrigerant evaporator and the refrigerant piping connecting the refrigerant downstream side of the refrigerant evaporator and the suction side of the refrigerant compressor connects the refrigerant downstream side of the second refrigerant evaporator and the suction side of the refrigerant compressor.

4. An air-conditioner as set forth in claim 1, wherein the first refrigerant piping has the refrigerant inside it flowing in a substantially vertical direction and the second refrigerant piping has the refrigerant inside it flowing in a substantially horizontal direction.

5. An air-conditioner as set forth in claim 2, wherein the first refrigerant piping has the refrigerant inside it flowing in a substantially vertical direction and the second refrigerant piping has the refrigerant inside it flowing in a substantially horizontal direction.

6. An air-conditioner as set forth in claim 3, wherein the first refrigerant piping has the refrigerant inside it flowing in a substantially vertical direction and the second refrigerant piping has the refrigerant inside it flowing in a substantially horizontal direction.

7. An air-conditioner as set forth in claim 1, wherein the refrigerant piping connecting the refrigerant downstream side of the refrigerant evaporator and the suction side of the refrigerant compressor is used for a vehicular air-conditioner.

8. An air-conditioner as set forth in claim 2, wherein the refrigerant piping connecting the refrigerant downstream side of the refrigerant evaporator and the suction side of the refrigerant compressor is used for a vehicular air-conditioner.

9. An air-conditioner as set forth in claim 3, wherein the refrigerant piping connecting the refrigerant downstream side of the refrigerant evaporator and the suction side of the refrigerant compressor is used for a vehicular air-conditioner.

10. An air-conditioner as set forth in claim 4, wherein the refrigerant piping connecting the refrigerant downstream side of the refrigerant evaporator and the suction side of the refrigerant compressor is used for a vehicular air-conditioner.

11. An air-conditioner as set forth in claim 5, wherein the refrigerant piping connecting the refrigerant downstream side of the refrigerant evaporator and the suction side of the refrigerant compressor is used for a vehicular air-conditioner.

12. An air-conditioner as set forth in claim 6, wherein the refrigerant piping connecting the refrigerant downstream side of the refrigerant evaporator and the suction side of the refrigerant compressor is used for a vehicular air-conditioner.

13. An air-conditioner as set forth in claim 7, wherein the second refrigerant evaporator is used for the rear seats of a vehicle.

14. An air-conditioner as set forth in claim 8, wherein the second refrigerant evaporator is used for the rear seats of a vehicle.

15. An air-conditioner as set forth in claim 9, wherein the second refrigerant evaporator is used for the rear seats of a vehicle.

16. An air-conditioner as set forth in claim 10, wherein the second refrigerant evaporator is used for the rear seats of a vehicle.

17. An air-conditioner as set forth in claim 11, wherein the second refrigerant evaporator is used for the rear seats of a vehicle.

18. An air-conditioner as set forth in claim 12, wherein the second refrigerant evaporator is used for the rear seats of a vehicle.

19. An air-conditioner as set forth in claim 1, wherein the first refrigerant piping has the refrigerant inside it flowing in a substantially vertical direction and the second refrigerant piping has the refrigerant inside it flowing from a low position to a high position.

20. An air-conditioner as set forth in claim 2, wherein the first refrigerant piping has the refrigerant inside it flowing in a substantially vertical direction and the second refrigerant piping has the refrigerant inside it flowing from a low position to a high position.

21. An air-conditioner as set forth in claim 3, wherein the first refrigerant piping has the refrigerant inside it flowing in a substantially vertical direction and the second refrigerant piping has the refrigerant inside it flowing from a low position to a high position.

* * * * *